United States Patent [19]

Eberhardt

[11] 4,089,345
[45] May 16, 1978

[54] DISCHARGE VALVE
[75] Inventor: H. Alfred Eberhardt, Paoli, Pa.
[73] Assignee: Hale Fire Pump Company, Conshohocken, Pa.
[21] Appl. No.: 721,459
[22] Filed: Sep. 8, 1976
[51] Int. Cl.² .............................................. F16k 11/00
[52] U.S. Cl. .................................. 137/596.2; 137/315; 251/315
[58] Field of Search ..................... 137/596, 596.2, 315; 239/110; 251/315, 319, 324

[56] References Cited

U.S. PATENT DOCUMENTS

| | | | |
|---|---|---|---|
| 2,665,879 | 1/1954 | Housekeeper et al. | 251/315 |
| 2,741,138 | 4/1956 | Russell | 251/315 |
| 2,916,254 | 12/1959 | Wendell | 251/315 |
| 3,173,648 | 3/1965 | McGuire et al. | 251/315 |
| 3,463,451 | 8/1969 | Treadwell | 251/315 |
| 3,464,449 | 9/1969 | Morton | 251/315 |
| 3,698,687 | 10/1972 | Kitamura | 251/315 |
| 3,714,968 | 2/1973 | Billeter | 137/315 |
| 3,770,016 | 11/1973 | Johnstone et al. | 137/596 |
| 3,985,334 | 10/1976 | Domyan | 251/315 |

*Primary Examiner*—Martin P. Schwadron
*Assistant Examiner*—G. L. Walton
*Attorney, Agent, or Firm*—Smith, Harding, Earley & Follmer

[57] ABSTRACT

A discharge valve for controlling the discharge flow of water from the delivery end of a fire pump including a valve body having an integral extension portion forming an inlet waterway for delivering water from the delivery end of the fire pump to the valve chamber of the discharge valve, a valve cover having an integral discharge portion for directing the water to the fire hose in a downward direction, and a push-pull drain valve formed integrally with and contained within the valve cover.

13 Claims, 4 Drawing Figures

DISCHARGE VALVE

BACKGROUND OF THE INVENTION

This invention relates generally to discharge valves and, more particularly, to a discharge valve adapted for use with pumps used on mobile fire fighting equipment to deliver water at high pressure to fire hose lines. The discharge valves to which this invention is directed are mounted on the fire truck to control the flow of water from the delivery end of a high pressure fire pump to a fire hose which is connected to a discharge nozzle at the downstream end of the discharge valve.

Since the discharge nozzle must extend beyond the panel of the fire truck and the pump delivery outlet is generally spaced a substantial distance from the panel, the discharge valve of the indicated type must be provided with some means for conveniently connecting the delivery end of the pump to the valve chamber of the discharge valve. Also, if the discharge nozzle of the valve extends in a horizontal direction, a fire hose connected thereto will tend to crimp as it hangs downwardly to the ground which could choke off the flow of water under some pressure conditions. On the other hand, when high pressure water is supplied to the hose, the hose tends to stand out horizontally a substantial distance to cause interference with the firemen working around the fire truck. Further, because of the high pressure of the liquid discharged from the fire pump, the hose connected to the outlet of the discharge valve could be damaged if the valve is held partially closed or "gated" unless it is protected from the resultant high velocity stream. Accordingly, it would be desirable to provide a discharge valve of the indicated type which overcomes the above-discussed problems involved in the delivery of high pressure water to a fire hose.

The discharge section of the fire pump equipment should also be provided with some means of handling the water which remains in the fire hose at the time the fireman shuts off the pumping system. Thus, if the fire hose is strung to a remote location and/or extends to a height of several stories, there is a substantial amount of water in the hose at the time the pump is shut off by the fireman. If the hose were simply disconnected from the discharge valve nozzle, the water within the hose would then run all over the area adjacent the fire truck which could be messy and provide an unsafe condition especially in freezing weather. Thus, the discharge valve should be provided with a drain valve which serves to permit the quick draining of the water from the fire hose in a manner such that it could be directed to intenal piping which is discharged underneath the fire truck at a safe location.

SUMMARY OF THE INVENTION

It is the general object of this invention to provide a discharge valve for use with fire pumps which obviates the above-discussed problems decribed in the Background of the Invention. Moreover, it is an object of the invention to achieve these desirable results with a discharge valve which is simple in construction and economical to manufacture. Thus, the discharge valve in accordance with the invention is provided with a valve cover having a portion forming a discharge nozzle which extends at an acute angle downward to the horizontal to thereby direct the discharged water at this angle. This serves to overcome the problem of hose crimping and hose interference and also protects the hose. Also, the valve cover is provided with an integral drain valve which communicates with the discharge nozzle and provides for the flow of water from the discharge nozzle to an outlet which is adapted to be connected to internal piping to thereby allow water to be drained from the hose through the drain valve to a safe location. Since this drain valve is of a "push-pull" design, the operator can readily and visually ascertain whether the valve is open or closed.

The above objects as well as other objects and features of the invention will become apparent from a consideration of the following description taken in conjunction with the accompanying drawings.

DETAILED DESCRIPTION OF THE PREFERRED EMBODIMENT

Figure 1:
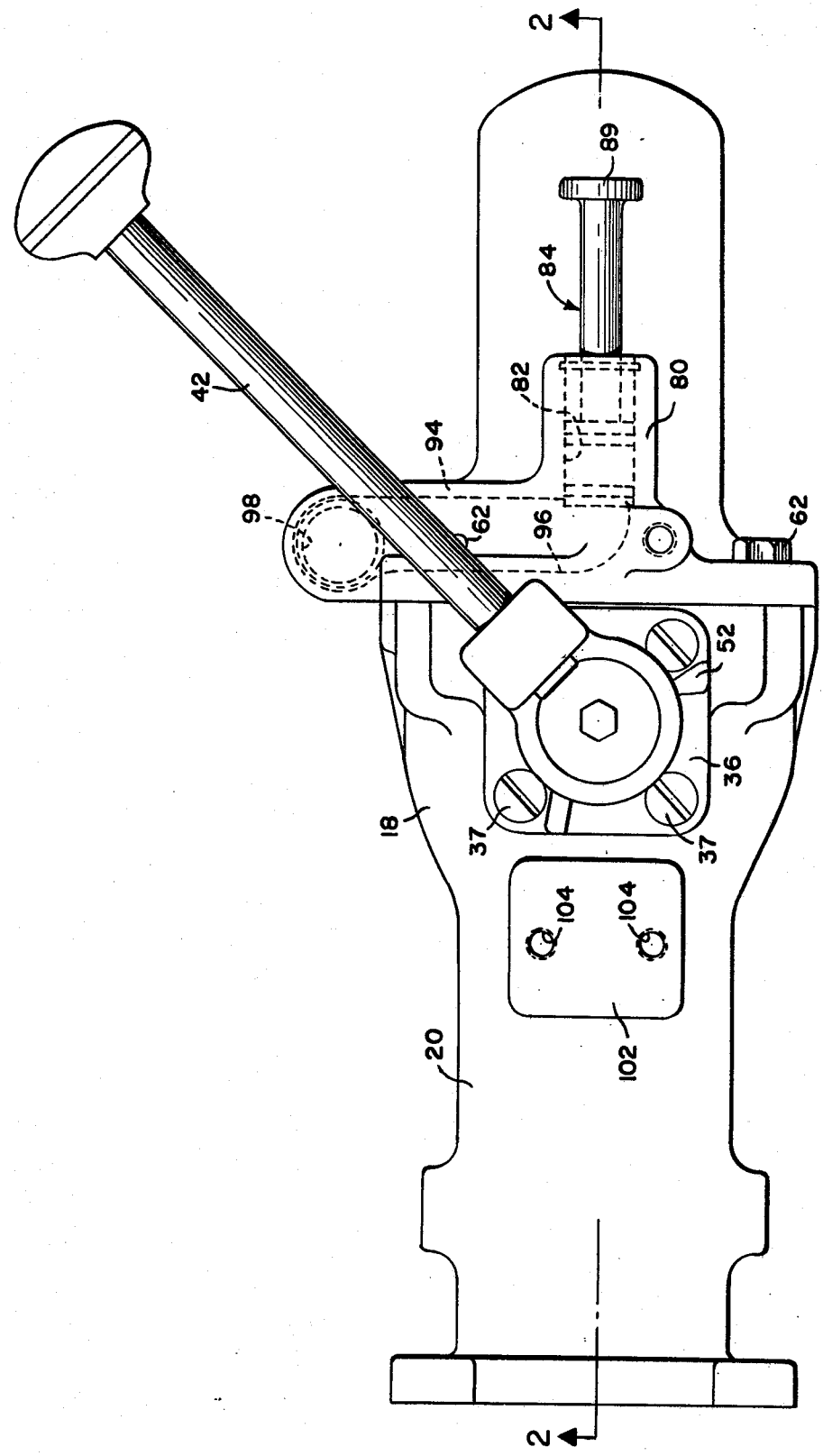
FIG. 1 is a plan view of a discharge valve in accordance with the invention.

Referring to the drawings, there is shown a discharge valve 10 in accordance with the invention for controlling the discharge flow of water from the delivery end 12 of a fire pump (not shown). The water is discharged from the discharge valve 10 into a fire hose 14. The discharge valve 10 is constructed and arranged to discharge the water at a location outside of the fire truck side panel which is located along a line 16 which is at a substantial distance from the delivery end 12 of the fire pump. To this end, the discharge valve 10 comprises a valve body 18 having an extension portion 20 which, when the discharge valve is mounted on the fire truck, provides an elongated horizontally extending waterway 22. The valve body 18 defines an internal valve chamber 24 at the downstream end of the waterway 22 and adapted to house a valve member 26.

The valve member 26 is an integral ball and shaft comprising a ball portion 28 and a shaft portion 30. The ball portion has a truncated hollow spherical configuration and includes a cylindrical internal flow passage 32 extending horizontally and adapted to be axially aligned with the inlet waterway 22 as is apparent from FIG. 1.

The valve member 26 is arranged to rotate about a vertical axis and is rotatably supported at its lower end by a trunnion 34 journalled in a bore in the valve body 18 and is rotatably supported at its upper end by a cover plate 36 which is mounted on top of the valve body 18 by suitable mounting screws 37 and encloses a top opening 38 in the valve body 18. The shaft portion 30 of the valve member 26 projects through a bore 40 in the cover plate 36 and is rotatably supported therein.

The valve member 26 is rotatable between open and closed positions by a valve handle 42 which is operatively connected to the valve member 26 by a locking mechanism as is described in copending application Ser. No. 681,597 filed Apr. 29, 1976. The locking mechanism as described in said copending application permits the positioning of the valve member 26 to a set position by movement of the valve handle 42 with the valve member 26 then being locked in this set position against any tendency to move by reason of the flow-induced forces acting on the valve member 26 as is described in detail in said copending application. Briefly, this locking action is produced by a coil spring 44 which is constructed and arranged to permit the rotation of the shaft porton 30 of the valve member 26 by the handle 42 but which prevents rotation of the valve member 26 by the action of flow induced forces by cooperating with the cover plate 36 to restrict such movement. The locking spring 44 is constructed to be self-locking torsionally within the counterbore 48 in the cover plate 36 but to be rotatable within the counterbore 48 upon the application of a tangential force to the locking spring 44 in a direction to decrease the coil diameter and release the locking pressure, which is achieved when the handle 42 is rotated. On the other hand, the locking spring 44 is mounted to cooperate with the shaft portion 30 of the valve member 26 such that when the valve member 26 starts to rotate it increases the coil diameter of the locking spring 44 which locks the valve member against rotation. This is described more fully in said copending application.

The handle 42 is provided with a stop 46 which projects downwardly from the handle in a location above the cover plate 36. The cover plate 36 is provided with cooperating stops 50 and 52 which cooperate with the stop 46 to limit the rotating movement of the handle 42 as is conventional in the art. The parts are constructed and arranged such that the handle may be rotated through a 90° movement with the valve member 26 being moved between the fully open position shown in FIG. 2 and a fully closed position in which the passage 32 extends at right angles to the position shown in FIG. 2. In the fully closed position the spherical portion of the valve member 26 cooperates with a valve seat insert 54 to block flow through the discharge valve 10.

The valve body 18 is provided with an end opening 56 which is located adjacent the downstream end of the valve chamber 24 in alignment with the inlet waterway 26. The end opening 56 is large enough to permit the insertion of the valve member 26 into the valve chamber 24 during the assembly of the valve member 26 into the position shown in FIG. 2. In the past, the valve member of a discharge valve of the indicated type was inserted through a top opening which required that this top opening be large enough to accept the valve member and that there be provided a large top cover plate. This also required that the valve chamber be of a substantial size. The present design permitting the insertion of the valve member 26 through end opening 56 permits the use of a relatively small cover plate 36 and a minimum size valve chamber 24.

The present design also permits easy access to the valve seat insert 54 for repair and replacement purposes. To this end, the insert 54 is mounted in a recessed seat 58 formed in a valve cover 60 which is mounted on the side of the valve body 18 by suitable mounting screws 62. The valve cover 60 has a cover portion 64 which encloses the side opening 56 in the valve body 18. The cover portion 64 and the valve body 18 are provided with cooperating faces 65 and 19, respectively. A seal 66 is located between the cooperating faces 65 and 19 and extends circumferentially around the opening 56.

The recessed seat 58 in the valve cover 60 provides an annular configuration in opposed relation to the ball portion 28 of the valve member 26 and is adapted to seat the insert 54 in a manner such that the insert 54 will cooperate with the ball portion 28 of the valve member 26 to perform a valve seating function. The valve seat insert 54 is of the type disclosed in U.S. Pat. No. 3,918,681 and comprises a rigid metal ring and a casing of flexible resilient material substantially encapsulating the metal ring. The insert 54 is dimensioned such that an enclosed pocket 70 is formed between the insert 54 and the recess 58 for receiving an O-ring seal 72. As is discussed fully in said patent, the O-ring seal 72 and the valve seat insert 54 serve to seat the ball portion 28 of the valve member 26 and preclude leakage from bypassing the valve regardless of the magnitude of the pressure or direction of the fluid flow through the valve.

Figure 2:
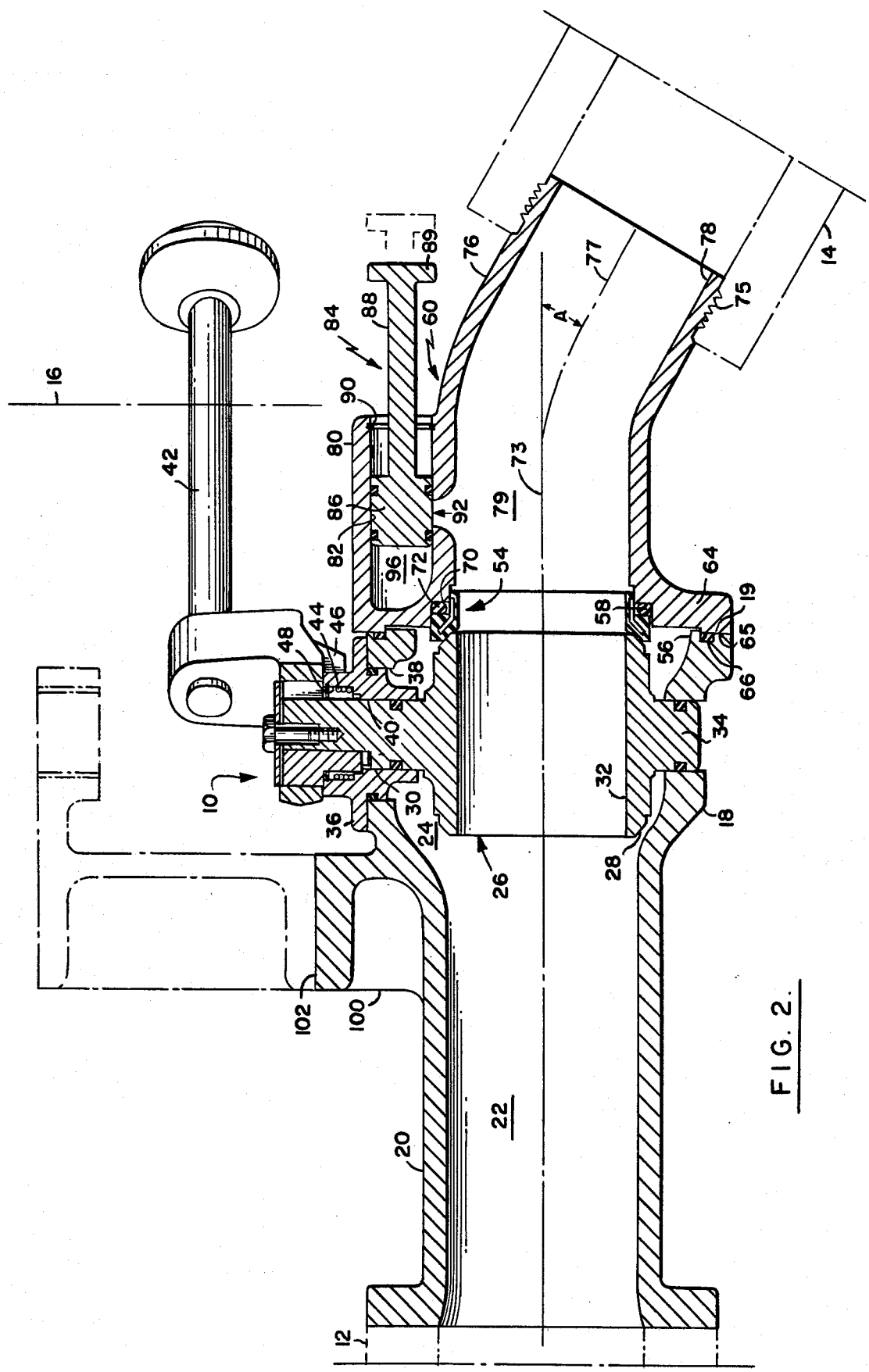
FIG. 2 is a vertical section taken on line 2—2 of FIG. 1.

The valve cover 60 is provided with a tubular discharge connection portion 76 extending outwardly from the recess 58 in a generally horizontal directon and then turning downwardly and terminating at an outlet port 78. The connection portion 76 is provided with external threads 75 in the region of the outlet port 78 for connection to a fire hose 14. The downwardly extending connection portion 76 extends on an axis 77 which makes an acute angle "A" with the horizontally extending longitudinal axis 73 of the inlet waterway and valve member flow passage 32. Angle "A" is approximately 30° as shown in FIG. 2 and preferably is less than about 45°.

The construction of the connection portion 76 serves to direct the flow of water from the discharge valve 10 in a downward direction at an angle of 30° to the horizontal. This arrangement obviates the problem of the impingement of the high velocity stream against the hose during "gating" and thus protects the same. In the discharge valve 10, the water being gated will flow in a relatively horizontal plane along the vertical center of the valve and therefore will impinge upon the downwardly extending portion 76 which is made of metal and can readily withstand this high velocity flow. Also, a fire hose connected to the nozzle portion 76 will extend downwardly therefrom at an angle to the horizontal and the high pressure water flowing through the fire hose will tend to maintain the fire hose in this downwardly extending condition. Accordingly, the fire hose will not extend outwardly horizontally to interfere with the firemen as is the case with the prior art devices. Furthermore, the nozzle portion presents a downwardly extending portion for easy attachment to the fire hose. Accordingly, the fire hose will hang downwardly from the end of the connection portion 76 at an angle to the horizontal to thereby minimize any possibility of crimping of the fire hose. By forming the downwardly extending connection portion as an integral part of the valve cover 60 of the discharge valve 10, as compared with various separate angle attachments used in the past, the discharge valve 10 will always provide a connection portion 76 with the proper downwardly extending orientation and one which is ready for use at all times.

The discharge valve 10 is also provided with a drain valve to permit the rapid draining and breakdown of fire hose lines. While drain valves have been provided in the past, they have never been provided as an integral part of the discharge valve in the compact arrangement as will be described hereafter. To this end, the valve cover 60 is provided with a body portion 80 defining a generally cylindrical drain valve chamber 82 located above the angled connection portion 76 as is apparent from FIG. 2. The chamber 82 is formed by machining a cylindrical bore adapted to receive a piston 86 of a drain valve member 84. The piston 86 is reciprocally slidable within the cylindrical bore forming the chamber 82. The drain valve member 84 also comprises a stem 88 extending from the piston 86 to the exterior of the body portion 80 and having an operating knob 89 on its extended end. A "snap ring" stop 90 is mounted in the outer end of the bore forming the chamber 82 and serves to limit the outward movement of the piston 86. The inward movement of the piston 86 is limited to the position shown in FIG. 2 at the inner end of the bore.

An inlet port 92 is formed in the top of cover 60 to provide communication between the chamber 82 and the upstream end of the waterway 79 defined within the cover 60. The valve member 84 is movable between a closed position as shown in FIG. 2 in which flow communication through the inlet port 92 and the valve chamber 82 is blocked by the piston 86 and an open position shown in dashed lines in FIG. 2 in which the piston is located to the right of the inlet port 92 to permit flow communication between the waterway 79 in cover 60 and the chamber 82 by way of the inlet port 92.

Figure 3:
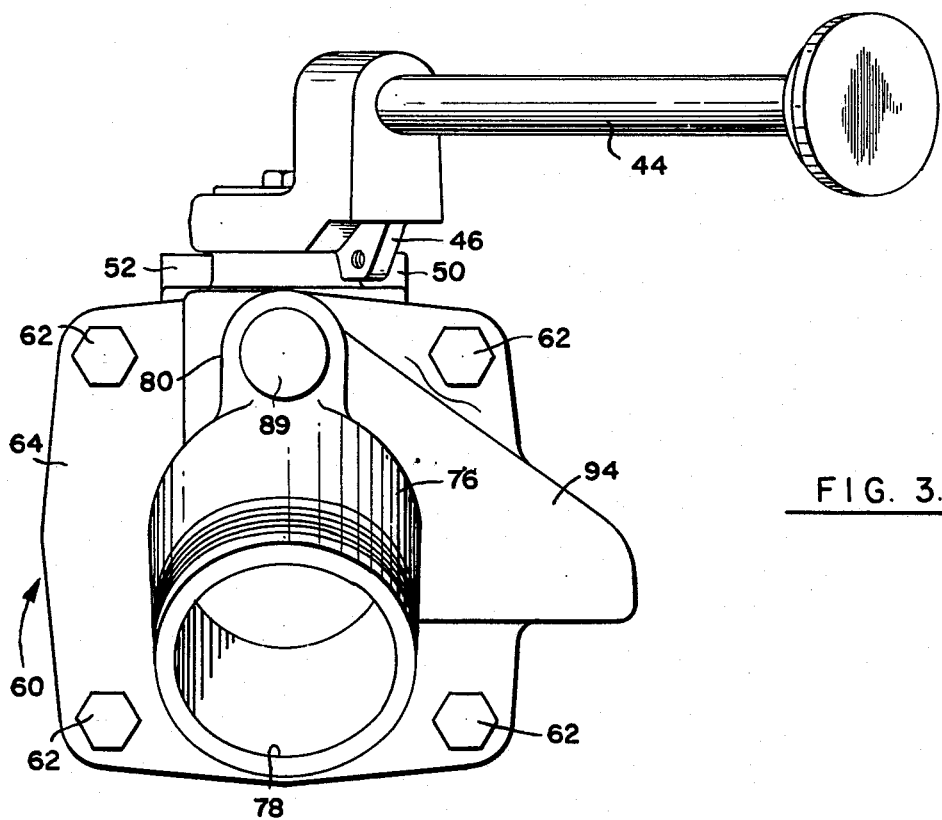
FIG. 3 is an end view of FIG. 1.
Figure 4:
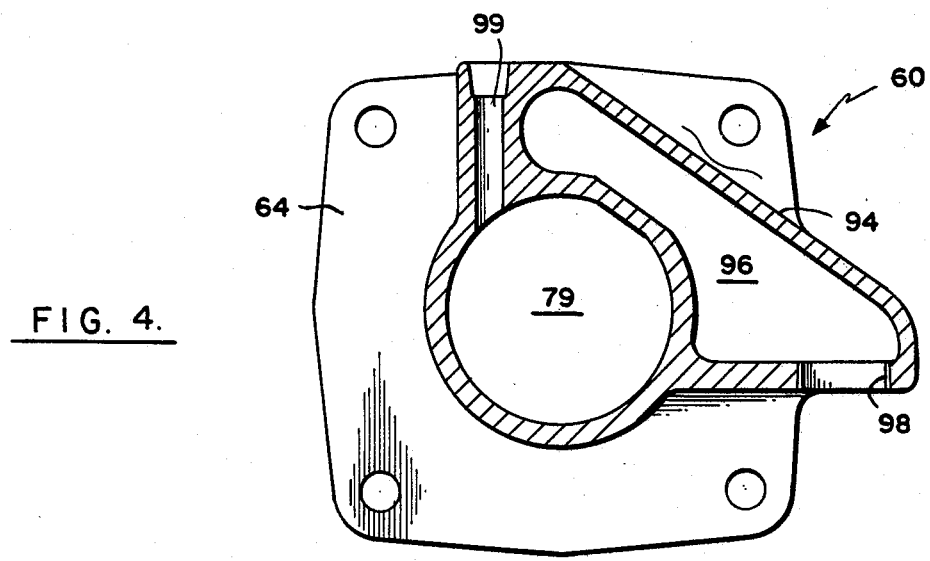
FIG. 4 is a sectional view of a valve cover.

The valve cover 60 is also provided with a body portion 94 extending from the inner end of the body portion 80 partially around the periphery of the cover 60 as is apparent from FIGS. 3 and 4. An outlet passage 96 is formed internally within the body portion 94 and extends from the inner end of the drain valve chamber 82 to an outlet port 98. In the use of the drain valve, suitable piping (not shown) is connected to the outlet port 98 to deliver drain water to a remote location underneath the fire truck.

In the operation of the drain valve to drain water from a fire hose on shutdown, the drain valve member 84 (which is normally in the closed position shown in FIG. 2) is opened by moving it to the right until the piston 86 contacts the stop 90. This is achieved by a fireman pulling on the knob 89, it being apparent that the drain valve is adapted to be operated by a simple push-pull operation. When the valve member 84 has been moved to the open position, water is allowed to flow from the waterway 79 (water being supplied from the hose 14) through the inlet port 92 into the valve chamber 82 from which the water flows through the outlet passage 96 to the outlet port 98 from which it is piped to ground by suitable piping.

The valve cover 60 is provided with a vertically extending passage 99 which serves as a pressure gauge connection.

The valve body 18 is provided with an integrally formed bracket 100 providing a horizontally extending support 102 having two tapped holes 104. The bracket 100 is thus adapted to mount a bracket assembly (shown in dashed lines in FIG. 2) for a remote control mechanism which is adapted to be operatively connected to a second handle 42 (not shown) for the control of another discharge valve on the opposite side of the fire truck.

I claim:

1. A discharge valve for mounting on a fire truck or the like for controlling the flow of water from a fire pump to a fire hose comprising:
    a valve body of a one-piece construction having a portion having an inlet waterway for the delivery of water from the discharge of the fire pump,
    means forming an outlet from said valve body,
    said valve body defining a valve chamber at the downstream end of said inlet waterway,
    a valve member rotatable within said valve chamber to control the flow of water through said valve body from said inlet waterway to said outlet,
    said discharge valve being mounted so that the water flows from said outlet along a horizontal axis,
    and a valve cover of a one-piece construction mounted in a fixed position on said valve body and having a portion forming a discharge passage for the flow of water from said outlet to a fire hose connected to said valve cover,
    said discharge forming portion being provided with means for connecting the end thereof to a fire hose,
    said discharge forming portion of said valve cover having its downstream end extending downwardly at a fixed predetermined angle from said horizontal axis to direct water flowing along said horizontal axis from said outlet downwardly at said fixed predetermined angle into a fire hose connected on the end thereof and extending therefrom to lay on the ground,
    said inlet waterway, said outlet, said valve chamber, and said discharge passage being of a substantial size to permit the flow of a volume of water to the fire hose sufficient for typical fire extinguishing purposes,
    said valve cover having an integral drain valve portion forming an inlet passage communicating with said discharge passage and an outlet passage adapted to be connected to drain valve piping,
    and including a drain valve member movable to open and close flow between said inlet and outlet passages of said drain valve,
    said drain valve member having an operating member adapted to be manually operated from the exterior of said valve cover between open and closed positions independently of the flow controlling position of said first-mentioned valve member.

2. A discharge valve according to claim 1 wherein said portion of said valve body forming said inlet waterway comprises an elongated extension extending a substantial distance from said valve chamber for connection to the discharge of the fire pump.

3. A discharge valve according to claim 1 wherein said portion of said valve body forming said inlet waterway comprises an elongated extension extending a substantial distance from said valve chamber for connection to the discharge of the fire pump.

4. A discharge valve according to claim 1 wherein said valve member includes an integral spherical ball portion and shaft portion rotatably mounted in said valve body, and said valve body includes a side opening located adjacent the downstream side of said valve chamber, said side opening being large enough to permit the insertion of said valve member into said valve chamber during the assembly of the discharge valve.

5. A discharge valve according to claim 4 wherein said valve cover is provided with an annular recess extending around said outlet from said valve body and aligned with said inlet waterway, and including an annular valve insert seated in said recess and adapted to cooperate with said valve member to perform a valve seating function for controlling the flow of water from said valve chamber into said discharge passage in said valve cover.

6. A discharge valve according to claim 5 wherein said valve body and said valve cover are provided with cooperating mating faces extending around said outlet from said valve body and including means providing a seal between said mating faces.

7. A discharge valve according to claim 1 wherein said inlet and outlet passage of said drain valve is of a substantial size to permit the rapid draining of a fire hose connected to said discharge forming portion of said valve cover.

8. A discharge valve according to claim 1 wherein said drain valve operating member is mounted for manual reciprocal movement between set positions for the opening and closing of flow between said inlet and outlet passages of said drain valve and is accessible for a push-pull operation between said positions thereof, said operating member being constructed and arranged to remain in either of said set positions upon movement thereto and manual release thereof.

9. A discharge valve for controlling the flow of water from a fire pump to a fire hose comprising:

a valve body of a one-piece construction having a portion forming an inlet waterway for the delivery of water from the discharge of the fire pump, means forming an outlet from said valve body, said valve body defining a valve chamber at the downstream end of said inlet waterway, a valve member rotatable within said valve chamber to control the flow of water through said valve body from said inlet waterway to said outlet, and a valve cover of a one-piece construction having a portion forming a discharge passage for the flow of water from said outlet to a fire hose connected to said valve cover, means fixedly mounting said valve cover on said valve body, said valve cover having an integral drain valve portion forming an inlet passage communicating with said discharge passage and an outlet passage adapted to be connected to drain valve piping, and including a drain valve member movable to open and close flow between said inlet and outlet passages of said drain valve, said drain valve member having an operating member adapted to be manually operated from the exterior of said valve cover independently of said first-mentioned valve member.

10. A discharge valve according to claim 9 wherein said portion of said valve body forming said inlet waterway comprising an elongated extension extending a substantial distance upstream from said valve member for connection to the discharge of the fire pump.

11. A discharge valve according to claim 10 wherein said valve cover is provided with an annular recess extending around said outlet from said valve body and aligned with said inlet waterway, and including an annular valve insert seated in said recess and adapted to cooperate with said valve member to perform a valve seating function for controlling the flow of water from said valve chamber into said discharge passage in said valve cover.

12. A discharge valve according to claim 9 wherein said inlet and outlet passage of said drain valve is of a substantial size to permit the rapid draining of a fire hose connected to said discharge forming portion of said valve cover.

13. A discharge valve according to claim 12 wherein said drain valve operating member is mounted for manual reciprocal movement between set positions for the opening and closing of flow between said inlet and outlet passages of said drain valve and is accessible for a push-pull operation between said positions thereof, said operating member being constructed and arranged to remain in either of said set positions upon movement thereto and manual release thereof.

* * * * *